(12) United States Patent
da Silva et al.

(10) Patent No.: US 12,103,995 B2
(45) Date of Patent: Oct. 1, 2024

(54) METHOD OF CONTROLLING POLYETHYLENE ARCHITECTURE

(71) Applicant: Braskem S.A., Camaçari (BR)

(72) Inventors: Jorge Manuel Jardim da Silva, São Paulo (BR); Hadi Mohammadi, Philadelphia, PA (US); Kevin Herrington, Philadelphia, PA (US); Manoela Ellwanger Cangussu, São Paulo (BR); Nei Sebastião Domingues Junior, São Paulo (BR); Adriane Gomes Simanke, São Paulo (BR)

(73) Assignee: Braskem S.A., Camaçari (BR)

( * ) Notice: Subject to any disclaimer, the term of this patent is extended or adjusted under 35 U.S.C. 154(b) by 246 days.

(21) Appl. No.: 17/715,678

(22) Filed: Apr. 7, 2022

(65) Prior Publication Data

US 2022/0325019 A1 Oct. 13, 2022

Related U.S. Application Data

(60) Provisional application No. 63/171,827, filed on Apr. 7, 2021.

(51) Int. Cl.
*C08F 210/02* (2006.01)
*C08F 2/38* (2006.01)
*C08F 218/10* (2006.01)

(52) U.S. Cl.
CPC ............. *C08F 218/10* (2013.01); *C08F 2/38* (2013.01); *C08F 210/02* (2013.01);
(Continued)

(58) Field of Classification Search
None
See application file for complete search history.

(56) References Cited

U.S. PATENT DOCUMENTS

2004/0226216 A1* 11/2004 Krull ...................... C10L 1/143
44/393
2009/0264585 A1* 10/2009 Avramidis ............ C08F 218/10
524/563
(Continued)

FOREIGN PATENT DOCUMENTS

EP 1433836 A1 6/2004
EP 1881054 A2 1/2008
(Continued)

OTHER PUBLICATIONS

Babu, R. P. et al., "Current progress on bio-based polymers and their future trends". Progress in Biomaterials 2013, 2(8), 1-16. (Year: 2013).*
Hexion Inc., Technical Data Sheet for VeoVa 10 Monomer. Aug. 31, 2016. (Year: 2016).*
International Search Report issued in corresponding International Application No. PCT/IB2022/020027; mailed Jul. 26, 2022 (4 pages).
(Continued)

*Primary Examiner* — Richard A Huhn
(74) *Attorney, Agent, or Firm* — Osha Bergman Watanabe & Burton LLP (57) ABSTRACT

A method of controlling long chain branching in an ethylene-based polymer includes polymerizing ethylene with one or more optional monomers to form an ethylene-based polymer, and controlling a degree of long chain branching (LCB) in the ethylene-based polymer. The degree of LCB ranges from 0.1 per 1000 carbon atoms in the polymer backbone to 10 per 1000 carbon atoms in the polymer backbone, as measured by $^{13}$CNMR. The degree of LCB is controlled by adding one or more branched vinyl ester to the polymerizing step in an amount ranging from 0.01 mol % to 5.0 mol %, relative to total monomer content. A polymer composition contains the ethylene-based polymer. An article includes the polymer composition containing the ethylene-based polymer.

17 Claims, 8 Drawing Sheets

(52) U.S. Cl.
CPC ...... *C08F 2500/07* (2013.01); *C08F 2500/08* (2013.01); *C08F 2500/09* (2013.01); *C08F 2500/17* (2013.01)

(56) References Cited

U.S. PATENT DOCUMENTS

| | | | |
|---|---|---|---|
| 2011/0287204 A1* | 11/2011 | Devisme | C08F 210/02 428/36.9 |
| 2021/0102014 A1* | 4/2021 | Hanlon | C08F 210/02 |
| 2021/0102015 A1* | 4/2021 | Hanlon | C08F 210/02 |

FOREIGN PATENT DOCUMENTS

| | | |
|---|---|---|
| JP | 4783209 B2 | 9/2011 |
| WO | 2021064474 A1 | 4/2021 |

OTHER PUBLICATIONS

Written Opinion of the International Searching Authority issued in corresponding International Application No. PCT/IB2022/020027; dated Jul. 26, 2022 (8 pages).

Z. Zhou et al., "Long Chain Branching Detection and Quantification in LDPE with Special Solvents, Polarization Transfer Techniques, and Inverse Gated 13C Nmr Spectroscopy," Macromolecules, vol. 51, No. 21, pp. 8443-8454, 2018 (12 pgs.).

W. Rungswang, K. Narkchamnan, N. Petcharat, B. Thitisak, and T. Pathaweeisariyakul, "Primitive structure and its morphology for describing highly branched structure of low-density polyethylene," Polym. Bull., vol. 74, No. 8, pp. 3229-3242, 2017 ( 14 pgs.).

T. P. Karjala et al., "Detection of low levels of long-chain branching in polydisperse polyethylene materials," J. Appl. Polym. Sci., 2011 (11 pgs.).

* cited by examiner

■Ethylene/branched VE copolymers ●Ethylene/Vinyl Acetate/branched VE terpolymers

METHOD OF CONTROLLING POLYETHYLENE ARCHITECTURE

BACKGROUND

Polyolefin materials such as polyethylene (PE) are the highest produced synthetic polymer ever invented. Success of these materials were greatly achieved due to its low production cost, energy efficiency, low greenhouse gas emission, versatility to produce a wide range of polymers with different properties, and high polymer processability. The wide range of articles produced with polyolefin materials includes films, molded products, foams, pipes, textiles, and the like. These products also have the attractiveness to be recycled by pyrolysis to gas and oil or by incineration to energy.

The physical and chemical properties of polyolefin compositions may exhibit varied responses depending on a number of factors such as molecular weight, distribution of molecular weights, content, nature and distribution of comonomer (or comonomers), the presence of short and/or long chain-branches and its distribution, thermal and shear history, and the like, which define their applicability in certain applications. To maximize the throughput while still obtaining acceptable final properties, some processing techniques require polyethylene with an intermediate or low level of long chain branching (LCB). In order to obtain a product with an intermediate or lower level of LCB at a competitive cost, it is a common practice in industry to blend highly branched polyethylene with essentially linear polyethylene.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of controlling long chain branching in an ethylene-based polymer. The method includes polymerizing ethylene with one or more optional monomers to form an ethylene-based polymer, and controlling a degree of long chain branching (LCB) in the ethylene-based polymer by adding one or more branched vinyl ester in an amount ranging from 0.01 mol % to 5.0 mol %, relative to total monomer content. The degree of LCB may range from 0.1 per 1000 carbon atoms in the polymer backbone to 10 per 1000 carbon atoms in the polymer backbone, as measured by $^{13}$CNMR.

In another aspect, embodiments disclosed herein relate to a polymer composition containing the ethylene-based polymer.

In yet another aspect, embodiments disclosed herein relate to an article containing the polymer composition.

Other aspects and advantages of the claimed subject matter will be apparent from the following description and the appended claims.

DETAILED DESCRIPTION

In one aspect, embodiments disclosed herein relate to a method of controlling long chain branching in an ethylene-based polymer. In particular, the long chain branching in an ethylene-based polymer may be controlled through the incorporation of one or more branched vinyl ester monomers during the polymerization.

Embodiments may be directed to methods of polymerizing ethylene with one or more optional monomers to form an ethylene-based polymer, and controlling a degree of long chain branching (LCB) in the ethylene-based polymer to a range from 0.1 per 1000 carbon atoms in the polymer backbone to 10 per 1000 carbon atoms in the polymer backbone, as measured by $^{13}$CNMR, by adding one or more branched vinyl ester to the polymerizing in an amount ranging from 0.01 mol % to 5.0 mol % relative to the total monomer content.

In the present disclosure, the term "long chain branching" refers to any polymer chains with 6 or more carbon atoms which are branched from the primary polymer backbone, and may also be abbreviated as "LCB" and used interchangeably. The terms "degree of chain branching" and "LCB content" refer to the amount of LCB in any polymer chains and may be used interchangeably and may be expressed as a number of LCB per 1000 carbon atoms in the polymer backbone.

Methods to Control LCB in Ethylene-Based Polymer

In one or more embodiments, the method of controlling LCB in an ethylene-based polymer in accordance with the present disclosure may include polymerizing ethylene with one or more optional monomers and may further include a radical initiator which initiates a free-radical polymerization. Polymerizing ethylene and one or more optional monomers may include a suitable method in the art including solution phase polymerization, gas phase polymerization, pressurized radical polymerization, bulk polymerization, emulsion polymerization, and suspension polymerization. In one or more embodiments, polymerization comprises radical initiators for free-radical polymerization in an amount from about 0.0001 to about 0.01 millimoles calculated as the total amount of one or more radical initiators for free-radical polymerization per liter of the volume of the polymerization zone. The amount of ethylene in the polymerization zone will depend mainly on the total pressure of the reactor. In one or more embodiments, the method may include polymerizing in the presence of a chain transfer agent.

In one or more embodiments, the method may include controlling a degree of LCB in the ethylene-based polymer by adding one or more branched vinyl esters (VE) to the polymerizing. The degree of LCB in the ethylene-based polymers may range from 0.1 to 10 per 1000 carbon atoms in the polymer backbone, such as a lower limit of any of 0.1, 0.25, 0.5, 0.75, or 1 to an upper limit of any of 5, 6, 7, 8, 9 or 10, where any lower limit may be paired with any upper limit, as measured by $^{13}$CNMR.

In one or more embodiments, the method may further include controlling a degree of LCB by adding the branched VE in an amount ranging from 0.01 mol % to 5.0 mol %, such as a lower limit selected from one of 0.01 mol %, 0.1 mol %, 0.5 mol %, 0.75 mol %, or 1 mol %, to an upper limit selected from 1.5 mol %, 2.0 mol %, 2.5 mol %, 3.0 mol %, 4.0 mol % or 5.0 mol % where any lower limit may be paired with any upper limit, relative to the total monomer content.

The method may include ethylene-based polymers, which are copolymers incorporating various ratios of ethylene and one or more branched VE. In one or more embodiments, the ethylene-based polymer may be prepared by reacting ethylene and a branched VE in the presence of additional comonomers and one or more radical initiators to form a copolymer. Copolymers may be prepared by reacting ethylene and one or more comonomers at one or more polymerization reaction stages to obtain various repeat unit microstructures.

In other embodiments, the method may include ethylene-based polymers which are terpolymers. Terpolymers may be prepared by reacting ethylene with a first comonomer to form a polymer resin or prepolymer, which is then reacted with a second comonomer to prepare the final ethylene-based polymer, wherein the first and the second comonomer can be added in the same reactor or in different reactors. In one or more embodiments, the terpolymers may consist of ethylene, one or more branched VE and vinyl acetate.

In one or more embodiments, the method may further include controlling the degree of LCB such that the degree of LCB is reduced when compared to a reference ethylene-based polymer without the one or more branched VE, in an amount ranging from 0% to 100%, such as a lower limit of any of 0%, 5%, 10% and 20% to an upper limit of any of 80%, 90%, 95% and 100%, where any lower limit may be paired with any upper limit.

In one or more embodiments, adding one or more branched VE in the ethylene-based polymer may reduce the LCB content. The reduction in the LCB content may be determined by obtaining Mark-Houwink (MH) plots of ethylene-based polymers containing different amounts of branched VE monomer and measuring the area under the curve of a "non-linear region." The "non-linear region" of a MH plot refers to as a portion of the MH plot between the point where the curve deviates from the initial linear slope, and the upper end of the curve. Methods to obtain MH plots are described in the subsequent section. Exemplary MH plots may be found in FIG. 7, curves 5 and 6. In these MH plots, the portion of the plot parallel to the line labeled as "linear reference" is considered to be a "linear region". From the point where the curve deviates from the "linear reference," such as a point with the Mw of approximately 100,000 g/mol in FIG. 7, to the upper end of the curve is considered to be a "non-linear region". The area under the molecular weight distribution curve within the non-linear region represents a branched material content. The change in the branched material content may be determined by obtaining various samples with different amounts of branched VE and comparing the areas under the curves of the non-linear region.

In one or more embodiments, the method may further include polymerizing and controlling conducted in a continuous or batch process at temperatures above 50° C. and at pressures above 1000 bar, known as high pressure polymerization systems. For example, a pressure of greater than 1000, 1100, 1200, 1500, 1600, 1700, 1800, 1900, 2000, 2100, 2200, 2300, 2400, 2500, 3000, 5000, or 10000 bar may be used. In one or more embodiments, the pressure may range from a lower limit selected from 1000, 1200, 1400 and 1600 bar to an upper limit of 1700, 1800, 2000, 2200 and 2500 bar, where any lower limit may be paired with any upper limit. Also, a temperature above 50, 60, 70, 80, 100, 120, 140, 150, 170, 180, 190, 200, 220, 240 or 250° C. may be used. In one or more embodiments, the temperature may range from a lower limit selected from 50, 60, 70, 80, 100 or 120° C. to an upper limit of 140, 150, 170, 180, 190, 200, 220, 240 or 250° C., where any lower limit may be paired with any upper limit. The polymerization media of the polymerization process in accordance with the present disclosure may include ethylene, one or more optional monomers, one or more branched VE, one or more initiators for free-radical polymerization, and optionally one or more inert solvent such as tetrahydrofuran (THF), chloroform, dichloromethane (DCM), dimethyl sulfoxide (DMSO), dimethyl carbonate (DMC), hexane, cyclohexane, ethyl acetate (EtOAc) acetonitrile, toluene, xylene, ether, dioxane, dimethyl-formamide (DMF), benzene or acetone.

Copolymers and terpolymers produced under high-pressure conditions may have number average molecular weights (Mn) of 1 to 10000 kDa. In one or more embodiments, the number average molecular weights (Mn) may range from a lower limit selected from 1, 5, 10, 50, 100 or 1000 kDa to an upper limit selected from 8000, 8500, 9000, 9500 or 10000 kDa, where any lower limit may be paired with any upper limit. weight average molecular weights (Mw) of 1 to 20000 kDa. In one or more embodiments, the weight average molecular weights (Mw) may range from a lower limit selected from 1, 5, 10, 50, 100 or 1000 kDa to an upper limit selected from 15000, 18000, 19000, 19500 or 20000 kDa, where any lower limit may be paired with any upper limit. Molecular weight distribution (MWD) is obtained from the ratio between the weight average molecular weight (Mw) and the number average molecular weight (Mn) obtained by GPC. Copolymers and terpolymers produced under high-pressure conditions may have MWD of 1 to 60. In one or more embodiments, MWD may range from a lower limit selected from 1, 2, 3, 4 or 5 to an upper limit selected from 55, 56, 57, 58 59 or 60, where any lower limit may be paired with any upper limit.

In one or more embodiments, the conversion during polymerization, which is defined as the ratio of weight or mass flow of the produced polymer divided by the weight of mass flow of monomers and comonomers may have a lower limit of any of 0.01%, 0.1%, 1%, 2%, 5%, 7%, 10% and an upper limit of any of 15%, 17%, 20%, 25%, 30%, 35%, 40%, 45%, 50%, 60%, 70%, 80%, 90%, 99% or 100%, where any lower limit may be paired with any upper limit.

Branched Vinyl Ester (VE) Monomers

In one or more embodiments, branched VE monomers may include branched VE generated from isomeric mixtures of branched alkyl acids. Branched VE monomers in accordance with the present disclosure may have the general structure (I):

(I)

where $R^1$, $R^2$, and $R^3$ have a combined carbon number in the range of C3 to C20. In one or more embodiments, $R^1$, $R^2$, and $R^3$ may all be alkyl chains having varying degrees of branching in one or more embodiments, or a subset of $R^1$, $R^2$, and $R^3$ may be independently selected from a group consisting of hydrogen, alkyl, or aryl in one or more embodiments.

In one or more embodiments, the branched VE monomers may include branched VE having the general structure (II):

(II)

wherein $R^4$ and $R^5$ have a combined carbon number of 6 or 7 and the ethylene-based polymer has a number average molecular weight ($M_n$) ranging from 5 kDa to 10000 kDa obtained by GPC. In one or more embodiments, $R^4$ and $R^5$ may have a combined carbon number of less than 6 or greater than 7, and the ethylene-based polymer may have an $M_n$ up to 10000 kDa. That is, when the $M_n$ is less than 5 kDa, $R^4$ and $R^5$ may have a combined carbon number of less than 6 or greater than 7, but if the $M_n$ is greater than 5 kDa, such as in a range from 5 to 10000 kDa, $R^4$ and $R^5$ may include a combined carbon number of 6 or 7. In particular embodiments, $R^4$ and $R^5$ have a combined carbon number of 7, and the $M_n$ may range from 5 to 10000 kDa. Further in one or more particular embodiments, a vinyl ester according to Formula (II) may be used in combination with vinyl acetate.

Examples of branched VE may include monomers having the chemical structures, including derivatives thereof:

-continued

In one or more embodiments, branched VE may include monomers and comonomer mixtures containing vinyl esters of neononanoic acid, neodecanoic acid, and the like. In one or more embodiments, branched vinyl esters may include Versatic™ acid series tertiary carboxylic acids, including Versatic™ acid EH, Versatic™ acid 9 and Versatic™ acid 10 prepared by Koch synthesis, commercially available from Hexion™ chemicals. In one or more embodiments, the method may include polymers generated from monomers derived from petroleum and/or renewable sources.

In the present disclosure, the terms "Branched vinyl ester monomers," "Branched vinyl ester (VE) monomers," and "Branched VE monomers" refer to as any of the branched vinyl ester monomers described in the previous paragraphs and may be used interchangeably.

Ethylene-Based Polymer Composition

The method in accordance with the present disclosure may include ethylene-based polymers with a percent by weight of ethylene measured by proton nuclear magnetic resonance ($^1$H NMR) and Carbon 13 nuclear magnetic resonance ($^{13}$C NMR) that ranges from a lower limit selected from one of 10 wt %, 20 wt %, or 30 wt %, to an upper limit selected from one of 60 wt %, 70 wt %, 80 wt %, 90 wt %, 95 wt %, 99.9 wt %, and 99.99 wt % where any lower limit may be paired with any upper limit.

In one or more embodiments, the method may include ethylene-based polymers with a percent by weight of vinyl acetate measured by $^1$H NMR and $^{13}$C NMR that ranges from a lower limit selected from one of 0 wt %, 0.01 wt %, 0.1 wt %, 1 wt %, 5 wt %, 10 wt %, 20 wt %, or 30 wt % to an upper limit selected from 50 wt %, 60 wt %, 70 wt %, 80 wt %, or 89.99 wt % where any lower limit may be paired with any upper limit.

In one or more embodiments, the method may include ethylene-based polymers that have a branched VE monomer content, such as that of Formula (I) and (II) above, that ranges from a lower limit selected from one of 0.01 mol %, 0.1 mol %, 0.5 mol %, 0.75 mol %, or 1 mol %, to an upper limit selected from 1.5 mol %, 2.0 mol %, 2.5 mol %, 3.0 mol %, 4.0 mol % or 5.0 mol % where any lower limit may be paired with any upper limit.

In one or more embodiments, the method may include an ethylene-based polymer with a number average molecular weight ($M_n$) in kilodaltons (kDa) measured by gel permeation chromatography (GPC) that ranges from a lower limit selected from one of 1 kDa, 5 kDa, 10 kDa, 15 kDa, and 20 kDa to an upper limit selected from one of 40 kDa, 50 kDa, 100 kDa, 300 kDa, 500 kDa, 1000 kDa, 5000 kDa, and 10000 kDa, where any lower limit may be paired with any upper limit.

The method may have an ethylene-based polymer with a weight average molecular weight ($M_w$) in kilodaltons (kDa) measured by GPC that ranges from a lower limit selected from one of 1 kDa, 5 kDa, 10 kDa, 15 kDa and 20 kDa to an upper limit selected from one of 40 kDa, 50 kDa, 100 kDa, 200 kDa, 300 kDa, 500 kDa, 1000 kDa, 2000 kDa, 5000 kDa, 10000 kDa, and 20000 kDa, where any lower limit may be paired with any upper limit.

The method may include ethylene-based polymers with a molecular weight distribution (MWD, defined as the ratio of $M_w$ over $M_n$) measured by GPC that has a lower limit of any of 1, 2, 5, or 10, and an upper limit of any of 20, 30, 40, 50, or 60, where any lower limit may be paired with any upper limit.

Initiators for Free-Radical Polymerization

The method in accordance with the present disclosure may include ethylene-based polymers synthesized with one or more initiators for radical polymerization capable of generating free radicals that initiate chain polymerization of comonomers and prepolymers in a reactant mixture. In one or more embodiments, radical initiators may include chemical species that degrade to release free radicals spontaneously or under stimulation by temperature, pH, or other triggers.

In one or more embodiments, radical initiators may include peroxides and bifunctional peroxides such as benzoyl peroxide; dicumyl peroxide; di-tert-butyl peroxide; tert-butyl cumyl peroxide; t-butyl-peroxy-2-ethyl-hexanoate; tert-butyl peroxypivalate; tertiary butyl peroxyneodecanoate; t-butyl-peroxy-benzoate; t-butyl-peroxy-2-ethyl-hexanoate; tert-butyl 3,5,5-trimethylhexanoate peroxide; tert-butyl peroxybenzoate; 2-ethylhexyl carbonate tert-butyl peroxide; 2,5-dimethyl-2,5-di (tert-butylperoxide) hexane; 1,1-di (tert-butylperoxide)-3,3,5-trimethylcyclohexane; 2,5-dimethyl-2,5-di(tert-butylperoxide) hexyne-3; 3,3,5,7,7-pentamethyl-1,2,4-trioxepane; butyl 4,4-di (tert-butylperoxide) valerate; di (2,4-dichlorobenzoyl) peroxide; di(4-methylbenzoyl) peroxide; peroxide di(tert-butylperoxyisopropyl) benzene; and the like.

Radical initiators may also include benzoyl peroxide, 2,5-di(cumylperoxy)-2,5-dimethyl hexane, 2,5-di(cumylperoxy)-2,5-dimethyl hexyne-3,4-methyl-4-(t-butylperoxy)-2-pentanol, 4-methyl-4-(t-amylperoxy)-2-pentanol, 4-methyl-4-(cumylperoxy)-2-pentanol, 4-methyl-4-(t-butylperoxy)-2-pentanone, 4-methyl-4-(t-amylperoxy)-2-pentanone, 4-methyl-4-(cumylperoxy)-2-pentanone, 2,5-dimethyl-2,5-di(t-butylperoxy)hexane, 2,5-dimethyl-2,5-di(t-amylperoxy)hexane, 2,5-dimethyl-2,5-di(t-butylperoxy) hexyne-3,2,5-dimethyl-2,5-di(t-amylperoxy)hexyne-3,2,5-dimethyl-2-t-butylperoxy-5-hydroperoxyhexane, 2,5-dimethyl-2-cumylperoxy-5-hydroperoxy hexane, 2,5-dimethyl-2-t-amylperoxy-5-hydroperoxyhexane, m/p-alpha, alpha-di[(t-butylperoxy)isopropyl]benzene, 1,3,5-tris(t-butylperoxyisopropyl)benzene, 1,3,5-tris(t-amylperoxyisopropyl)benzene, 1,3,5-tris(cumylperoxyisopropyl)benzene, di[1,3-dimethyl-3-(t-butylperoxy)butyl]carbonate, di[1,3-dimethyl-3-(t-amylperoxy)butyl]carbonate, di[1,3-dimethyl-3-(cumylperoxy)butyl]carbonate, di-t-amyl peroxide, t-amyl cumyl peroxide, t-butyl-isopropenylcumyl peroxide, 2,4,6-tri(butylperoxy)-s-triazine, 1,3,5-tri[1-(t-butylperoxy)-1-methylethyl]benzene, 1,3,5-tri-[(t-butylperoxy)-isopropyl]benzene, 1,3-dimethyl-3-(t-butylperoxy)butanol, 1,3-dimethyl-3-(t-amylperoxy)butanol, di(2-phenoxyethyl) peroxydicarbonate, di(4-t-butylcyclohexyl)peroxydicarbonate, dimyristyl peroxydicarbonate, dibenzyl peroxydicarbonate, di(isobornyl)peroxydicarbonate, 3-cumylperoxy-1,3-dimethylbutyl methacrylate, 3-t-butylperoxy-1,3-dimethylbutyl methacrylate, 3-t-amylperoxy-1,3-dimethylbutyl methacrylate, tri(1,3-dimethyl-3-t-butylperoxy butyloxy)vinyl silane, 1,3-dimethyl-3-(t-butylperoxy)butyl N-[1-{3-(1-methylethenyl)-phenyl) 1-methylethyl]carbamate, 1,3-dimethyl-3-(t-amylperoxy) butyl N-[1-{3(1-methylethenyl)-phenyl}-1-methylethyl] carbamate, 1,3-dimethyl-3-(cumylperoxy))butyl N-[1-{3-(1-methylethenyl)-phenyl}-1-methylethyl]carbamate, 1,1-di (t-butylperoxy)-3,3,5-trimethylcyclohexane, 1,1-di(t-butylperoxy)cyclohexane, n-butyl 4,4-di(t-amylperoxy) valerate, ethyl 3,3-di(t-butylperoxy)butyrate, 2,2-di(t-amylperoxy)propane, 3,6,6,9,9-pentamethyl-3-ethoxycabonylmethyl-1,2,4,5-tetraoxacyclononane, n-butyl-4,4-bis(t-butylperoxy)valerate, ethyl-3,3-di(t-amylperoxy)butyrate, benzoyl peroxide, OO-t-butyl-O-hydrogen-monoperoxy-succinate, OO-t-amyl-O-hydrogen-monoperoxy-succinate, 3,6,9, triethyl-3,6,9-trimethyl-1,4,7-triperoxynonane (or methyl ethyl ketone peroxide cyclic trimer), methyl ethyl ketone peroxide cyclic dimer, 3,3,6,6, 9,9-hexamethyl-1,2,4,5-tetraoxacyclononane, 2,5-dimethyl-2,5-di(benzoylperoxy)hexane, t-butyl perbenzoate, t-butylperoxy acetate, t-butylperoxy-2-ethyl hexanoate, t-amyl perbenzoate, t-amyl peroxy acetate, t-butyl peroxy isobutyrate, 3-hydroxy-1,1-dimethyl t-butyl peroxy-2-ethyl hexanoate, OO-t-amyl-O-hydrogen-monoperoxy succinate, OO-t-butyl-O-hydrogen-monoperoxy succinate, di-t-butyl diperoxyphthalate, t-butylperoxy (3,3,5-trimethylhexanoate), 1,4-bis(t-butylperoxycarbo)cyclohexane, t-butylperoxy-3,5,5-trimethylhexanoate, t-butyl-peroxy-(cis-3-carboxy)propionate, allyl 3-methyl-3-t-butylperoxy butyrate, OO-t-butyl-O-isopropylmonoperoxy carbonate, OO-t-butyl-O-(2-ethyl hexyl) monoperoxy carbonate, 1,1,1-tris[2-(t-butylperoxy-carbonyloxy)ethoxymethyl]propane, 1,1,1-tris [2-(t-amylperoxy-carbonyloxy)ethoxymethyl]propane, 1,1, 1-tris[2-(cumylperoxy-cabonyloxy)ethoxymethyl]propane, OO-t-amyl-O-isopropylmonoperoxy carbonate, di(4-methylbenzoyl)peroxide, di(3-methylbenzoyl)peroxide, di(2-methylbenzoyl)peroxide, didecanoyl peroxide, dilauroyl peroxide, 2,4-dibromo-benzoyl peroxide, succinic acid peroxide, dibenzoyl peroxide, di(2,4-dichloro-benzoyl)peroxide, and combinations thereof.

In one or more embodiments, radical initiators may include azo-compounds such as azobisisobutyronitrile (AIBN), 2,2'-azobis(amidinopropyl) dihydrochloride, and the like, azo-peroxide initiators that contain mixtures of peroxide with azodinitrile compounds such as 2,2'-azobis (2-methyl-pentanenitrile), 2,2'-azobis(2-methyl-butanenitrile), 2,2'-azobis(2-ethyl-pentanenitrile), 2-[(1-cyano-1-methylpropyl)azo]-2-methyl-pentanenitrile, 2-[(1-cyano-1-ethylpropyl)azo]-2-methyl-butanenitrile, 2-[(1-cyano-1-methylpropyl)azo]-2-ethyl, and the like.

In one or more embodiments, radical initiators may include Carbon-Carbon ("C—C") free radical initiators such as 2,3-dimethyl-2,3-diphenylbutane, 3,4-dimethyl-3,4-diphenylhexane, 3,4-diethyl-3,4-diphenylhexane, 3,4-dibenzyl-3,4ditolylhexane, 2,7-dimethyl-4,5-diethyl-4,5-diphenyloctane, 3,4-dibenzyl-3,4-diphenylhexane, and the like.

In one or more embodiments, the method may include ethylene-based polymers synthesized with one or more radical initiators present at a percent by weight of the total polymerization mixture (wt %) that ranges from a lower limit selected from one of 0.000001 wt %, 0.0001 wt %, 0.01 wt %, 0.1 wt %, 0.15 wt %, 0.4 wt %, 0.6 wt %, 0.75 wt % and 1 wt %, to an upper limit selected from one of 1.25 wt %, 1.5 wt %, 2 wt %, 4 wt %, and 5 wt %, where any lower limit can be used with any upper limit. Further, it is envisioned that the concentration of the radical initiator may be more or less depending on the application of the final material.

Stabilizers

The method in accordance with the present disclosure may include ethylene-based polymers with one or more stabilizers, present at a percent by weight of total polymerization mixture, capable of preventing polymerization in the feed lines of monomers and comonomers but not hindering polymerization at the reactor.

In one or more embodiments, stabilizers may include nitroxyl derivatives such as 2,2,6,6-tetramethyl-1-piperidinyloxy, 2,2,6,6-tetramethyl-4-hydroxy-1-piperidinyloxy, 4-oxo-2,2,6,6-tetramethyl-1-piperidinyloxy, 2,2,6,6-tetramethyl-4-amino-piperidinyloxy, and the like.

In one or more embodiments, ethylene-based polymers may include one or more stabilizers at a percent by weight of the total polymerization mixture (wt %) that ranges from a lower limit selected from one of 0.000001 wt %, 0.0001 wt %, 0.01 wt %, 0.1 wt %, 0.15 wt %, 0.4 wt %, 0.6 wt %, 0.75 wt % and 1 wt %, to an upper limit selected from one of 1.25 wt %, 1.5 wt %, 2 wt %, 4 wt %, and 5 wt %, where any lower limit can be used with any upper limit. Further, it is envisioned that the concentration of the stabilizer may be more or less depending on the application of the final material.

Additives

The method in accordance with the present disclosure may include ethylene-based polymers with fillers and additives that modify various physical and chemical properties when added to the ethylene-based polymer during blending. The additives and fillers may include, but are not limited to, kickers, processing aids, lubricants, antistatic agents, clarifying agents, nucleating agents, beta-nucleating agents, slipping agents, antioxidants, antacids, light stabilizers such as HALS, IR absorbers, whitening agents, organic and/or inorganic dyes, anti-blocking agents, processing aids, flame-retardants, plasticizers, biocides, and adhesion-promoting agents.

The method may include ethylene-based polymers with one or more inorganic fillers such as talc, glass fibers, marble dust, cement dust, clay, carbon black, feldspar, silica or glass, fumed silica, silicates, calcium silicate, silicic acid powder, glass microspheres, mica, metal oxide particles and nanoparticles such as magnesium oxide, antimony oxide, zinc oxide, inorganic salt particles and nanoparticles such as barium sulfate, wollastonite, alumina, aluminum silicate, titanium oxides, calcium carbonate, polyhedral oligomeric silsesquioxane (POSS).

In one or more embodiments, the method may contain ethylene-based polymers with one or more additives and/or fillers at a percent by weight of the total composition (wt %) that ranges from a lower limit selected from one of 0.01 wt %, 0.02 wt %, 0.05 wt %, 1.0 wt %, 5.0 wt %, 10.0 wt %, 15.0 wt %, and 20.0 wt %, to an upper limit selected from one of 25 wt %, 30 wt %, 40 wt %, 50 wt %, 60 wt %, and 70 wt %, where any lower limit can be used with any upper limit.

In one or more embodiments, the method may include polymerizing the ethylene-based polymers in the presence of a chain transfer agent. Examples of chain transfer agents may include methane, ethane, propane, propylene, trimethylamine, dimethylamine, chloroform, carbon tetrachloride and combinations thereof. The chain transfer agent may be present by weight of the total composition (wt %) that ranges from a lower limit selected from one of 0.0000001 wt %, 0.001 wt %, 0.01 wt %, 0.02 wt %, 0.05 wt %, 1.0 wt % to an upper limit selected from one of 2.0 wt %, 3.0 wt %, 4.0 wt %, 5.0 wt %, where any lower limit can be used with any upper limit.

Determination of Long Chain Branching $^{13}$CNMR Analysis

In $^{13}$CNMR analysis, long chain branching (LCB) is defined as any branches in the molecular structure with six or more carbons. Based on $^{13}$CNMR spectra, LCB content ($B_{6+}$) in branched polymers is calculated from:

$$B_{6+} = S_{3,Polymer} - S_{3,vinyl\ ester\ monomers}$$

where the $S_3$ peak is positioned at 32.2 ppm on a $^{13}$CNMR spectrum. This method takes into account both branches ($B_{6+}$) and the chain ends of the main chain, where the effect of the long branches in the vinyl ester monomer is corrected using its $^{13}$CNMR spectrum, and the effect of chain ends can also be corrected with GPC data. Values reported for $B_{6+}$ are normalized to 1000 carbon atoms in the polymer backbone.

GPC Analysis

Long chain branching frequency (LCBf) may be calculated from GPC analysis, for example, using a GPC instrument equipped with IR5 infrared detector and a four-capillary viscometry detector, both from Polymer Char. Data collection may be performed using, for example, Polymer Char's software to obtain data such as molecular weight (e.g. number average molecular weight (Mn) and weight average molecular weight (Mw)). The concentration measured by IR5 detector may be calculated considering that the whole area of the chromatogram was equivalent to the elution of 100% of the mass injected. Average LCBf may be then calculated according to:

$$LCBf = \frac{1000 B_n R}{M_w}$$

where R is the molar mass of the repeated unit and is calculated based on the contribution of monomer and comonomers, considering the mol percentage of each one, determined by NMR. $M_w$ is the weight average molecular weight and is calculated according to the following equation by means of universal calibration:

$$M_w = \left[ \frac{\sum (N_i M_i^2)}{\sum (N_i M_i)} \right]$$

Average $B_n$ constant is calculated according to:

$$g = \left[ \left(1 + \frac{B_n}{7}\right)^{1/2} + \frac{4B_n}{9\pi} \right]^{-1/2}$$

Average g' and g constants are calculated according to:

$$g' = \frac{IV_{Branched}}{IV_{Linear}} \quad g' = g^\varepsilon$$

ε is known as the viscosity shielding ratio and is assumed to be constant and equal to 0.7.

The intrinsic viscosity of the branched samples ($IV_{branched}$) may be calculated using the specific viscosity ($\eta_{sp}$) from the viscometer detector as follows.

$$IV_{branched} = \frac{\sum_i (\eta_{sp})_i \Delta V_i}{SA} \frac{1}{10 KIV}$$

where SA is sample amount, KIV is viscosity detector constant and the volume increment ($\Delta V$) is a constant determined by the difference between consecutive retention volumes ($\Delta V = RV_{i+1} - RV_i$).

The intrinsic viscosity of the linear counterpart ($IV_{linear}$) may be calculated using Mark-Houwink equation, whereas the Mark-Houwink constants are obtained from the intrinsic viscosity considering the concentration from Stacy-Haney method as follows.

The Stacey-Haney IV ($IV_{SH}$) is calculated based on Stacy-Haney concentration by $$IV_{SH_i} = \frac{1}{KIV} \frac{\eta_{sp_i}}{C_{SH_i}},$$

where $C_{SH}$ is found from $$C_{SHi} = \frac{(\ln \eta_{rel})_i K}{(hv)_i^{a/a+1}}$$

whereas $\eta_{rel}$ is the relative viscosity ($\eta_{rel} = \eta_{sp} + 1$), $(hv)_i$ is the hydrodynamic volume at each elution volume slice from the universal calibration curve and the Mark-Houwink exponent, a, was defined as 0.725, reference value for a linear polyethylene homopolymer and the constant, K, is calculated according to:

$$K = \frac{\frac{SA}{\Delta V}}{\sum \frac{(\ln \eta_{rel})_i}{(hv)_i^{a/a+1}}}$$

From $IV_{SH_i}$ the molecular weight ($M_{SH}$) on each elution volume slice is also obtained according to $$M_{SH_i} = \frac{hv_i}{IV_{SH_i}}$$

Plotting $IV_{SH_i}$ versus $M_{SH_i}$, both in log scale, ("NM plot") leads to Mark-Houwink constants k and a for the linear polymer. Finally, $IV_{linear}$ may be calculated as:

$$IV_{linear} = kM_v^a$$

where $M_v$ is the viscosity average molecular weight by means of universal calibration and the concentration by IR5 infrared detector, and is calculated according to:

$$M_v = \left[ \frac{\sum (N_i M_i^{a+1})}{\sum (N_i M_i)} \right]^{1/a}$$

where $N_i$ is the number of ith molecules with molecular weight of $M_i$. The $M_i$ is obtained considering the concentration by IR5 infrared detector and the hydrodynamic volume from the universal calibration $$\left( M_i = \frac{hv_i}{\frac{1}{KIV} \frac{\eta_{sp_i}}{C_{IR_i}}} \right).$$

$M_i$ is plotted against the retention volume, the noisy extremes of the curve are removed and then extrapolated using a third order fit polynomial. The equation derived from this 3° order fit polynomial is used to calculate the $M_i$ as a function of retention volume.

Rheological Analysis

Complex viscosity (11*) of the ethylene-based polymers may be determined using a rheometer, such as a small angle oscillatory shear (SAOS) rheometer with parallel plates, and test according to ASTM D1084-08 at a temperature of 150° C.

Physical Properties of the Ethylene-Based Polymers

In one or more embodiments, the method may include ethylene-based polymers having a long chain branching frequency (LCBf), calculated by GPC analysis, ranging from 0 LCBf/1000 carbon atoms to 20 LCBf/1000 carbon atoms, such as from a lower limit of any of 0, 0.1, 0.25, 0.5, 0.75, 1, 2 or 3 and to an upper limit of any of 7, 8, 9, 10, 12, 14, 15 16, 18 or 20, where any lower limit may be paired with any upper limit.

Embodiment method may also include ethylene-based polymers having a zero-shear viscosity ($\eta_0$) at 150° C. ranging from 10 Pa·s to 5×10$^6$ Pa·s, such as from a lower limit of any of 10 Pa·s, 50 Pa·s, or 100 Pa·s to an upper limit of any of 1×10$^5$ Pa·s, 1×10$^6$ Pa·s or 5×10$^6$ Pa·s where any lower limit may be paired with any upper limit. Zero-shear viscosity may be measured by a MCR501 rotational rheometer from Anton Paar, equipped with 25 mm parallel plates. A Carver press is utilized to compression-mold the ethylene-based polymer at 120° C. to form a 2 mm thick sheet. The sheet is then cooled to ambient temperature and samples with 25 mm in diameter are cut out using a hole punch. The sample is placed in the rheometer and angular frequencies between 0.3 and 500 rad/s are measured at a strain of 5%. Data is taken at least 3 temperatures between 100° C. and 190° C. under a nitrogen atmosphere. The Cox-Merz rule is assumed, and time temperature superposition is used to create a master curve at 150° C. The zero-shear viscosity, $\eta_0$, is calculated by fitting the following Cross equation:

$$\eta = \eta_0/(1+(\dot\gamma \tau_0)^{1-n})$$

where n is the power law index. $\eta$ and $\dot\gamma$ are the shear viscosity and the corresponding shear rate, respectively. $\tau_0$ is the Cross time constant. The reciprocal of $\tau_0$ gives the critical shear rate for the onset of shear thinning.

In one or more embodiments, the method may include ethylene-based polymers with a density according to ASTM D792 in a range having a lower limit selected from any of 0.85 g/cm$^3$, 0.87 g/cm$^3$, and 0.90 g/cm$^3$, to an upper limit selected from any of 1.10 g/cm$^3$, 1.20 g/cm$^3$, and 1.30 g/cm$^3$, where any lower limit may be paired with any upper limit.

In one or more embodiments, the method may include ethylene-based polymers with a bio-based carbon content, as determined by ASTM D6866-18 Method B, in a range having a lower limit selected from any of 1%, 5%, 10%, and 20%, to an upper limit selected from any of 60%, 80%, 90%, and 100%, where any lower limit may be paired with any upper limit.

In one or more embodiments, the method may include ethylene-based polymers with a melt flow rate (MFR)

according to ASTM D1238 at 190° C./2.16 kg in a range having a lower limit selected from any of 0.01 g/10 min, 0.5 g/10 min, 1 g/10 min, 10 g/10 min, 70 g/10 min, 80 g/10 min, 90 g/10 min, and 100 g/10 min to an upper limit selected from any of 140 g/10 min, 150 g/10 min, 160 g/10 min, 170 g/10 min, 200 g/10 min 350 g/10 min, 450 g/10 min, 550 g/10 min, 1000 g/10 min, and 2000 g/10 min where any lower limit may be paired with any upper limit.

In one or more embodiments, the method may include ethylene-based polymers with crystallinity measured according to ASTM D3418 by differential scanning calorimetry (DSC) or wide angle X-ray diffraction (WAXD) in a range having a lower limit selected from any 0.1%, 1%, 10%, and 20%, to an upper limit selected from any of 60%, 70%, and 80%, where any lower limit may be paired with any upper limit.

In one or more embodiments, the method may include ethylene-based polymers with a glass transition temperature ($T_g$) measured by dynamic mechanical analysis (DMA) or according to ASTM D3418 by DSC in a range having an upper limit selected from any 100° C., 90° C., and 80° C., to a lower limit selected from any of −50° C., −60° C., and −70° C., where any lower limit may be paired with any upper limit.

In one or more embodiments, the method may include ethylene-based polymers with a melting temperature ($T_m$) measured according to ASTM D3418 by DSC in a range having a lower limit selected from any of 0° C., 10° C., 20° C., 30° C., and 40° C., to an upper limit selected from any of 100° C., 110° C., 120° C., 130° C., 140° C., and 150° C., where any lower limit may be paired with any upper limit. In one or more embodiments, The method may include polymers that may not present a $T_m$, characterizing a completely amorphous ethylene-based polymer.

In one or more embodiments, the method may include ethylene-based polymers with a crystallization temperature ($T_c$) measured according to ASTM D3418 by DSC in a range having a lower limit selected from any of 0° C., 5° C., 10° C., 20° C., 30° C., and 40° C. and to an upper limit selected from any of 80° C., 90° C., 100° C., 110° C., 120° C., 130° C., 140° C., and 150° C., where any lower limit may be paired with any upper limit.

In one or more embodiments, the method may include ethylene-based polymers with a heat of crystallization measured according to ASTM D3418 by DSC in a range having a lower limit of any of 0, 10, 20, 30, 40, 50, and 60 J/g, and an upper limit of any of 140, 180, 200, 240, and 280 J/g, where any lower limit may be paired with any upper limit.

The polymerization conditions result in the production of ethylene-based polymers having a wide range of molecular weight distribution (MWD). In one or more embodiments, The method may include polymers with the MWD obtained within this polymerization method from about 1 to about 60, with a lower limit of any of 1, 1.5, 3, 5, or 10, and an upper limit of any of 10, 20, 30, 40, 50, or 60, where any lower limit can be used in combination with any upper limit. However, depending on the amount of comonomer incorporated, samples produced under high-pressure conditions show a broad range of MWDs from about 1 to 60.

Copolymers and terpolymers produced under low-pressure conditions may exhibit number average molecular weights of 1 to 300 kDa, weight average molecular weights of 1 to 1000 kDa and MWDs of 1 to 60. On the other hand, copolymers and terpolymers produced under high-pressure conditions may show number average molecular weights of 1 to 10000 kDa, weight average molecular weights of 1 to 20000 kDa and MWDs of 1 to 60.

In one or more embodiments, the method may include ethylene-based polymers having a hardness as determined according to ASTM D2240 in a range having a lower limit selected from any 25, 35, and 45 Shore A, to an upper limit selected from any of 80, 90, and 100 Shore A, where any lower limit may be paired with any upper limit.

In one or more embodiments, the method may include ethylene-based polymers having a hardness as determined according to ASTM D2240 in a range having a lower limit selected from any 10, 20, and 30 Shore D, to an upper limit selected from any of 50, 60, and 70 Shore D, where any lower limit may be paired with any upper limit.

In one or more embodiments, the method may include ethylene-based polymers having a percent elongation, tensile strength, and modulus as determined according to ASTM D368 in a range having a lower limit selected from any 10, 50, and 100 percent elongation, to an upper limit selected from any of 500, 1000, and 2000 percent elongation, a lower limit selected from any 1, 5, and 10 MPa tensile strength, to an upper limit selected from any of 15, 30, 70, 100, and 500 MPa tensile strength, a lower limit selected from any 0.1, 1, 5, 20, and 40 MPa modulus, to an upper limit selected from any of 100, 200, 300, 1000, and 5000 MPa modulus, and where any lower limit may be paired with any upper limit.

EXAMPLES

The following examples are merely illustrative, and should not be interpreted as limiting the scope of the present disclosure. Ethylene-based polymers incorporating various amounts of a vinyl carbonyl monomer VeoVa™ 10 from HEXION™ (a mixture of isomers of branched vinyl esters of versatic acid having a carbon number of 10) and optionally vinyl acetate (VA) under high-pressure conditions were produced to assay a number of polymer properties for the resulting compositions.

Ethylene, VeoVa™ 10 (Hexion), tertbutylperoxy-2-ethylhexanoate, heptane (99%, Sigma Aldrich), and vinyl acetate (99%, Sigma Aldrich) were used as received.

Example 1

An ethylene-based polymer was prepared using a continuous high-pressure autoclave mini plant. In order to reduce the risk of polymerization in the pump, VeoVa™ 10 was diluted with 20 wt % heptane. Prior to dilution, a test was conducted to ensure VeoVa™ 10 was miscible with heptane. A mixture of tertbutylperoxy-2-ethylhexanoate (TBPEH) (initiator) in heptane with a concentration of 2 mol ppm was fed into the reactor using a syringe system. All mixtures (VeoVa™ 10/heptane and initiator/heptane) were purged with nitrogen for ten minutes before use. One-liter membrane pumps were used to feed the VeoVa™ 10 solution into the reactor. Before polymerization, the reactor was purged five times with 2200-2300 bars of ethylene. Resonance time in the reactor was 90 seconds. The reactor was equipped with an inline IR detector to monitor the reactions. Each reaction was begun by heating the reactor to 190° C. and feeding ethylene to a pressure of 1900-2000 bar. A continuous flow of ethylene with a rate of 2000 g/hr was fed into the reactor. Once the targeted pressure and stable ethylene flow was achieved, an appropriate amount of VeoVa™ 10/heptane was added to the reaction to achieve the target mol % of branched VE in the ethylene-based polymer. The mixture of initiator in heptane and chain transfer agent (propylene) was introduced to the system at a flow rate of 2 mL/hr and 50 g/hr, respectively. The samples were collected after the reactor was operated for 15 minutes.

Example 2-6

An ethylene-based polymer was prepared as described in EXAMPLE 1 except the amount of VeoVa™ 10/heptane mixture in continuous polymerization was varied. The resulting mol % of branched VE in polyethylene are shown in Table 1.

Example 7-13

An ethylene-based polymer was prepared as described in EXAMPLE 1 except the amount of VeoVa™ 10/heptane mixture in continuous polymerization was varied and appropriate amount of vinyl acetate (VA) was added. The resulting mol % of VA and branched VE in polyethylene are shown in Table 1.

Example 14-22

An ethylene-based polymer was prepared as described in EXAMPLE 1 except the amount of VeoVa™ 10/heptane mixture in continuous polymerization was varied. The resulting mol % of branched VE in polyethylene are shown in Table 1.

Example 23-28

EXAMPLES 23 to 30 are exemplary polymers of one or more embodiments produced in an industrial plant that normally operates producing EVA copolymers. For EXAMPLE 23-28, EVA with 28 wt % VA being produced was transitioned to the terpolymer by adjusting the reactor parameters and gradually replacing the vinyl acetate feed stream with VeoVa 10™ until the desired comonomers ratios were obtained. EXAMPLE 29 is produced as the vinyl acetate and VeoVa 10™ feed streams is replaced by ethylene. The general reactor conditions for the production of the aforementioned polymers are provided in Table 2

Reference Example 1

An ethylene-based polymer was prepared as described in EXAMPLE 1 except no VeoVa™ 10/heptane mixture was added. The resulting mol % of VA in polyethylene is shown in Table 1.

The rheological properties of the samples, including complex viscosity, were evaluated by MCR501 rotational rheometer from Anton Paar, equipped with 25 mm parallel plates. A Carver press was utilized to compression-mold the ethylene-based polymer at 120° C. to form a 2 mm thick sheet. The sheet was then cooled to ambient temperature and samples with 25 mm in diameter were cut out using a hole punch. The sample was placed in the rheometer and angular frequencies between 0.3 and 500 rad/s were measured at a strain of 5%. Data were taken at least 3 temperatures between 100° C. and 190° C. under a nitrogen atmosphere. The Cox-Merz rule was assumed and time temperature superposition was used to create a master curve at 150° C. The zero-shear viscosity, $\eta_0$, was calculated by fitting the following Cross equation:

$$\eta = \eta_0 / (1 + (\dot{\gamma}\tau_0)^{1-n})$$

where n is the power law index. $\eta$ and $\dot{\gamma}$ are the shear viscosity and the corresponding shear rate, respectively. $\tau_0$ is the Cross time constant. The reciprocal of $\tau_0$ gives the critical shear rate for the onset of shear thinning.

Weight average molecular weight ($M_w$) and molecular weight distribution of the sample were measured in 1,2,4-trichlorobenzene (TCB) at 145° C. using the triple detector GPC from Polymer Char as defined above.

Figure 2:
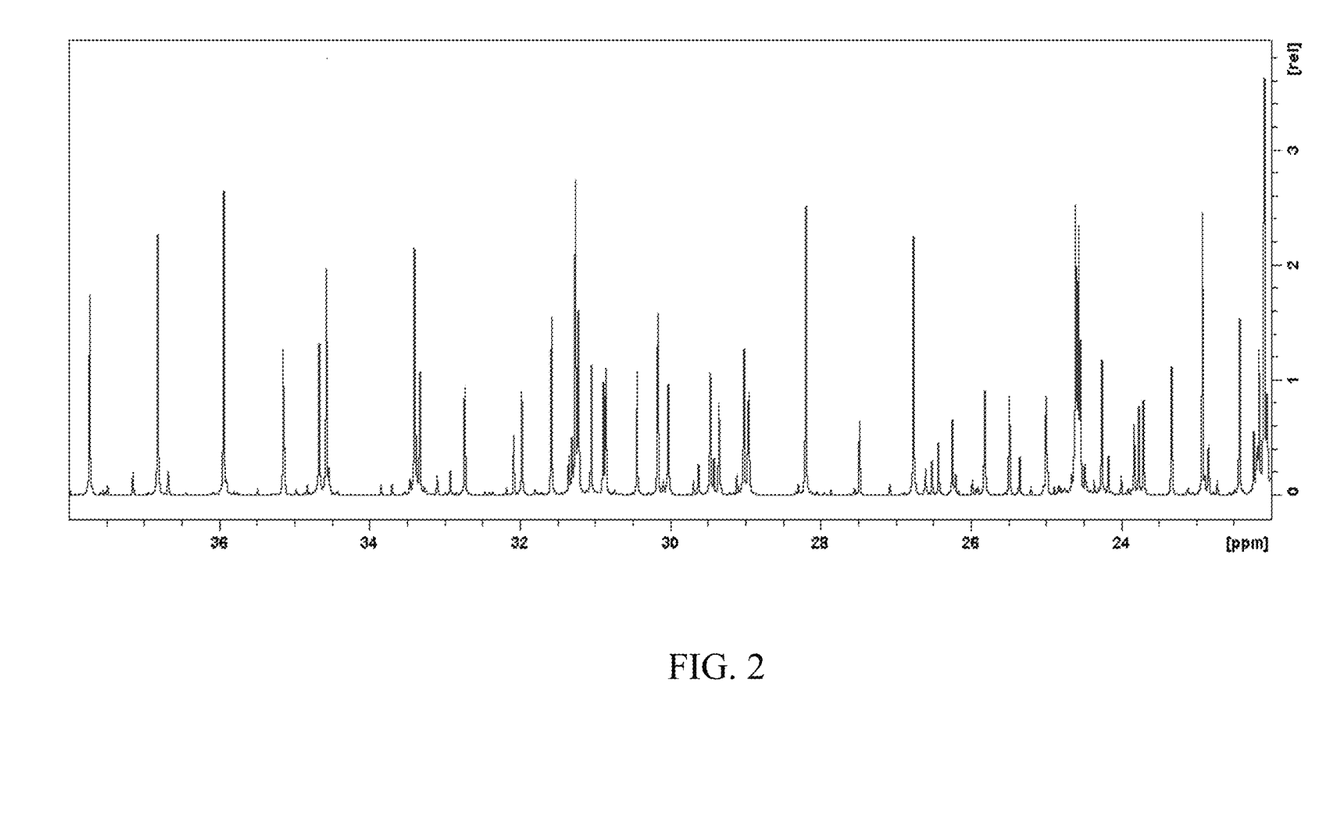
FIG. 2 is a $^{13}$CNMR spectra graph of a branched VE monomer in the S3 region.

The amount of branched VE in each sample was determined based on their $^1$HNMR and $^{13}$CNMR spectra. The representative sample was dissolved in trichloroethylene TCE-$d_2$ and the full $^{13}$CNMR spectra was obtained at 393.1 K and 125 MHz. The $^{13}$CNMR spectra of VeoVa™ 10 as received were also obtained using the same method. The $^{13}$CNMR spectra of VeoVa™ 10 are shown in FIG. 2.

Further, the LCB content of the resulting ethylene-based polymer was determined by obtaining appropriate peak values from the $^{13}$CNMR spectra of the ethylene-based polymers and calculating using the equations provided in the previous section.

Table 1 provides a summary of the chemical compositions of EXAMPLE 1-29, and REFERENCE EXAMPLE 1.

TABLE 1

Polymer Chemical Compositions

| Sample | | Branched VE in Polymer (mol %) | VA in Polymer (mol %) |
|---|---|---|---|
| Example 1 | VeoVa 3 | 0.48 | 0 |
| Example 2 | VeoVa 5 | 0.68 | 0 |
| Example 3 | VeoVa 10 | 1.26 | 0 |
| Example 4 | VeoVa 15 | 1.69 | 0 |
| Example 5 | VeoVa 20 | 3.25 | 0 |
| Example 6 | VeoVa 25 | 4.62 | 0 |
| Example 7 | VeoVa 25 VA 5 | 4.43 | 2.04 |
| Example 8 | VeoVa 20 VA 10 | 3.65 | 4.37 |
| Example 9 | VeoVa 15 VA 15 | 2.60 | 6.62 |
| Example 10 | VeoVa 10 VA 20 | 1.79 | 8.57 |
| Example 11 | VeoVa 5 VA 25 | 0.33 | 10.00 |
| Example 12 | VeoVa 5 VA 23 | 4.95 | 25.79 |
| Example 13 | VeoVa 9 VA 19 | 8.44 | 21.17 |
| Example 14 | VeoVa 0 | 0 | 0 |
| Example 15 | VeoVa 0.5 | 0.07 | 0 |
| Example 16 | VeoVa 0.9 | 0.13 | 0 |
| Example 17 | VeoVa 1.3 | 0.19 | 0 |
| Example 18 | VeoVa 1.8 | 0.25 | 0 |
| Example 19 | VeoVa 2.3 | 0.33 | 0 |
| Example 20 | VeoVa 2.6 | 0.37 | 0 |
| Example 21 | VeoVa 3.6 | 0.52 | 0 |
| Example 22 | VeoVa 4.3 | 0.62 | 0 |
| Example 23 | VA 28 | 0.0 | 11.2 |
| Example 24 | VeoVa 2 VA 28 | 0.4 | 11.5 |
| Example 25 | VeoVa 4 VA 26 | 0.7 | 10.7 |
| Example 26 | VeoVa 6 VA 26 | 1.1 | 11.2 |
| Example 27 | VeoVa 7 VA 22 | 1.3 | 9.0 |
| Example 28 | VeoVa 9 VA 22 | 1.7 | 9.4 |
| Example 29 | VA 4 | 0.0 | 1.3 |
| Reference Example 1 | VA 30 | 0 | 11.78 |

TABLE 2

Industrial reactor production conditions

| | |
|---|---|
| Pressure reactor 1 (kgf/cm$^2$) | 1820-1840 |
| Temperatures reactor 1 (° C.) | 164.5 |
| Pressure reactor 2 (kgf/cm$^2$) | 1780-1800 |
| Temperatures reactor 2 (° C.) | 161.7 |
| Production rate (kg/h)* | 6000 |

Figure 1:
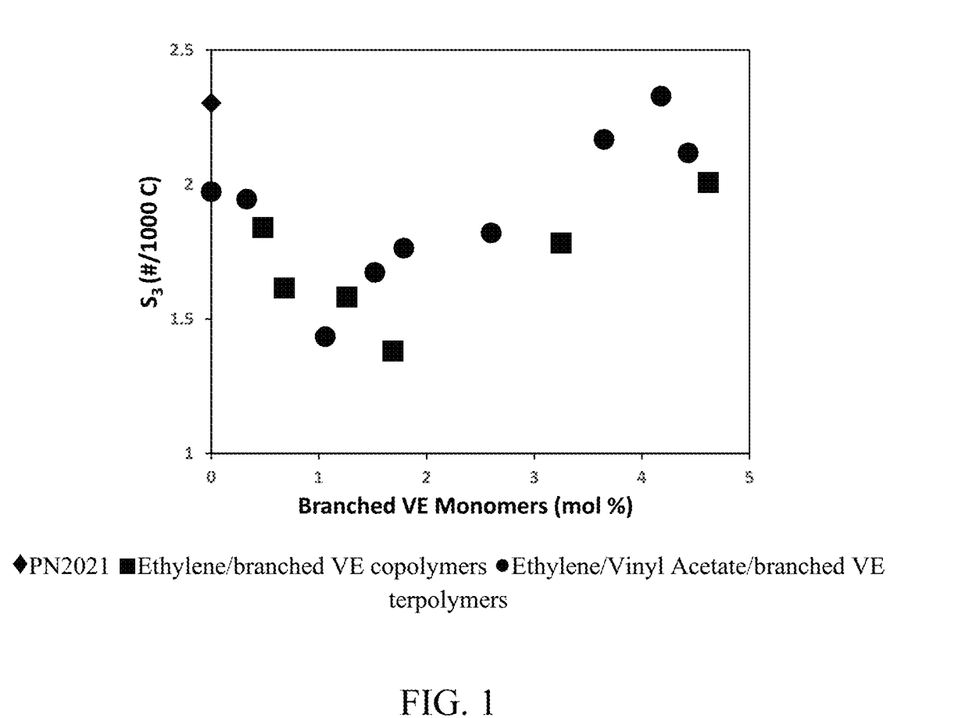
FIG. 1 illustrates a number of S3 carbon atoms per 1000 carbon atoms in the polymer backbone as a function of branched VE monomer concentration.

FIG. 1 shows a number of S3 carbon atoms per 1000 carbon atoms in the polymer backbone (S3$_{polymer}$) as a function of branched VE monomer concentration. FIG. 1 demonstrates that the number of S3 carbon, which is expected to correlate with the LCB content, appears to increase linearly above 1.5 mol % of branched VE in the ethylene-based polymer.

However, the number of S3 carbon shown in FIG. 1 includes the contribution from the branched VE in addition to the LCB content of the reacted ethylene-based polymer. FIG. 2 shows a $^{13}$CNMR spectra of the branched VE used in the examples (VeoVa™ 10). From the $^{13}$CNMR spectra of FIG. 2, a relative amount of S3 signal contributed by branched VE may be obtained ($S3_{vinyl\ ester\ monomers}$). Using the equation below, corrected S3 value, or $B_{6+}$, may be obtained:

$$B_{6+} = S_{3,Polymer} - S_{3,vinyl\ ester\ monomers}$$

where $S_{3\ polymer}$ is an $S_3$ peak positioned at 32.2 ppm on a $^{13}$CNMR spectrum of the ethylene-based polymer and $S3_{vinyl\ ester\ monomers}$ is an S3 peak positioned at 32.2 ppm on a $^{13}$CNMR spectrum of the one or more branched vinyl ester monomers, as shown in FIG. 2.

Figure 3:
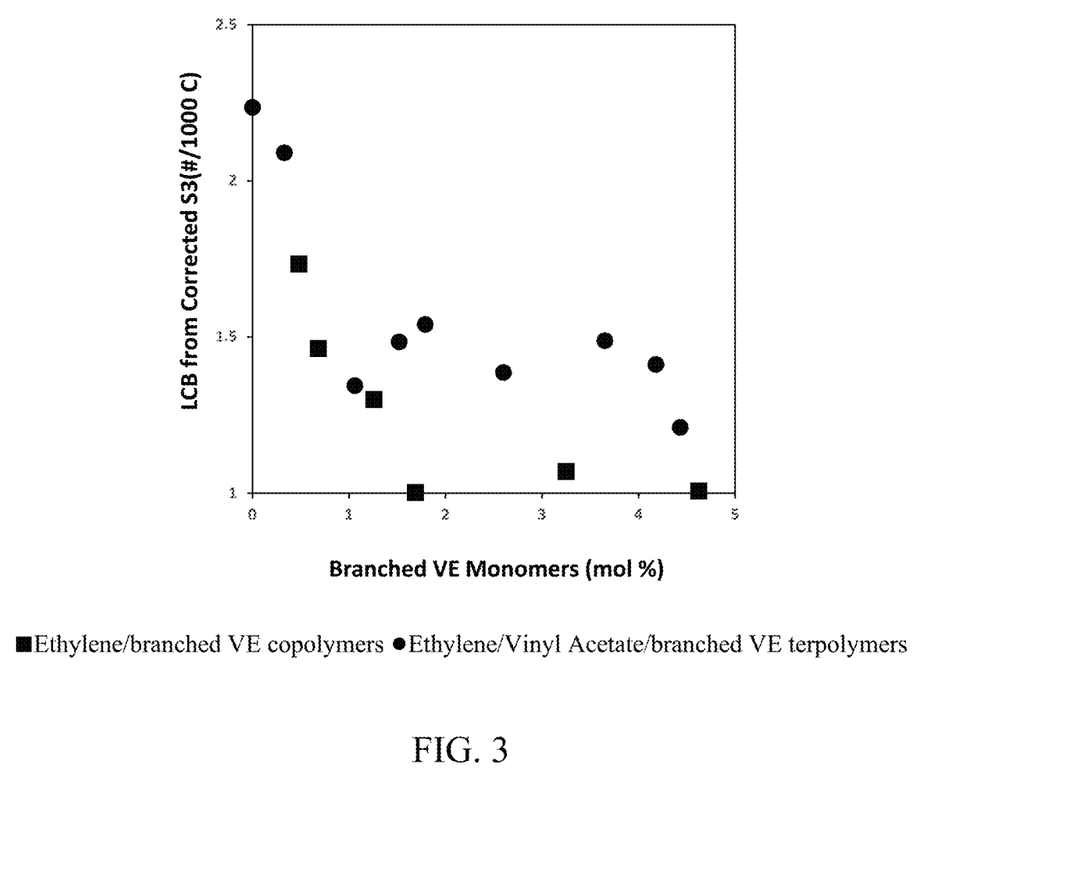
FIG. 3 illustrates an LCB content per 1000 carbon atoms in the polymer backbone as a function of branched VE monomer concentration.

FIG. 3 Represents LCB contents ($B6_+$) per 1000 carbon atoms in the polymer backbone as a function of branched VE monomer concentration. The data suggest that the LCB content decreases until it reaches a plateau at the concentration of branched VE above 1.5 mol %. However, the samples containing VA show higher number of LCB in this region.

Figure 4:
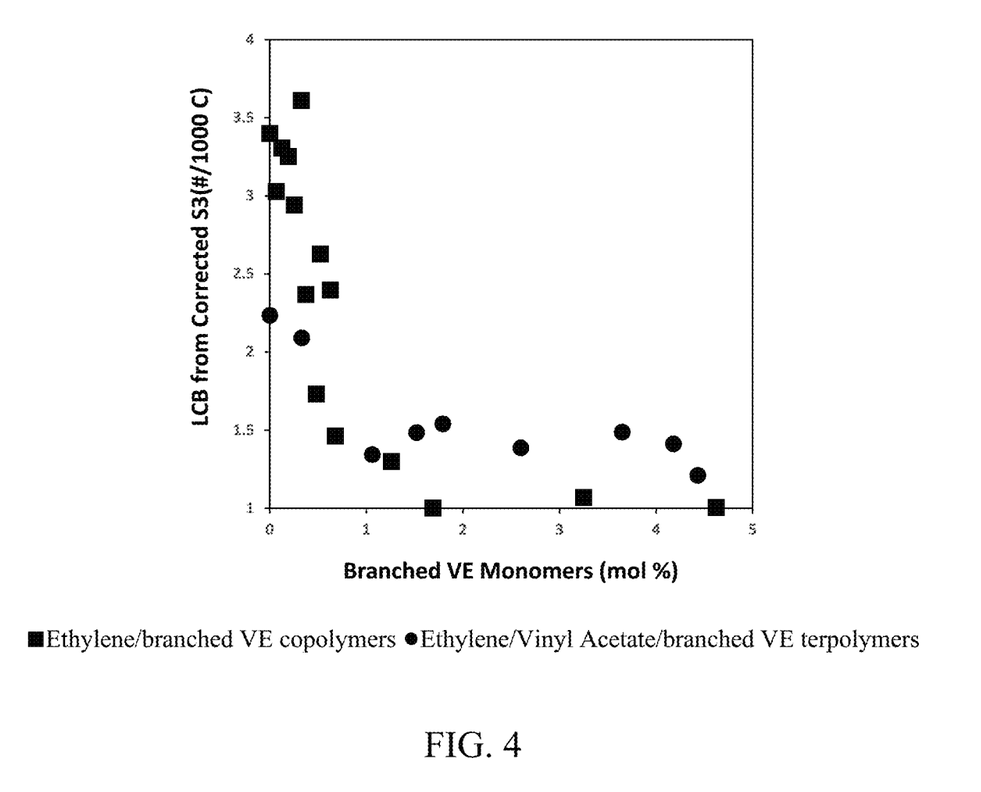
FIG. 4 illustrates an LCB content per 1000 carbon atoms in the polymer backbone as a function of branched VE monomer concentration.

FIG. 4 Represents LCB contents ($B6_+$) per 1000 carbon atoms in the polymer backbone as a function of branched VE monomer concentration including data for lower amounts of branched VE monomer concentrations. The data further verifies that the LCB content decreases with the concentration of branched VE.

Figure 5A:
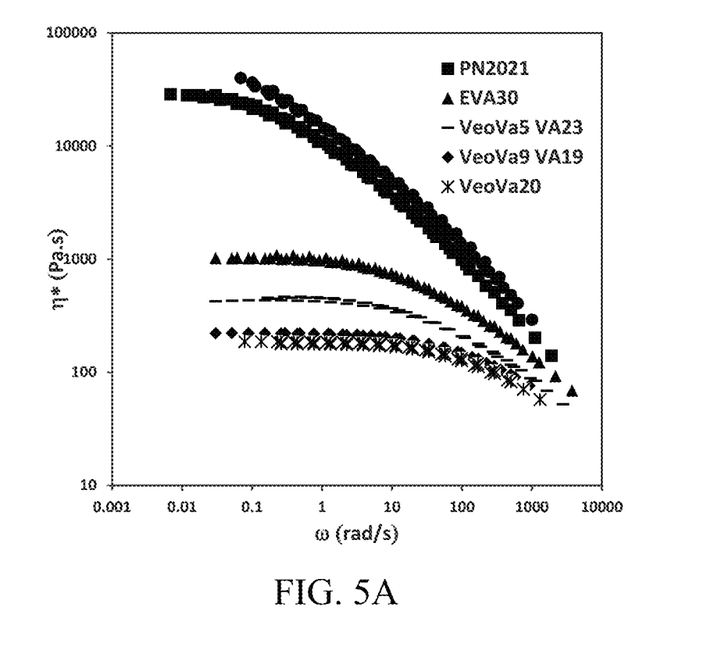
FIG. 5A illustrates complex viscosity of various ethylene-based polymers as a function of angular frequency at 150° C.
Figure 5B:
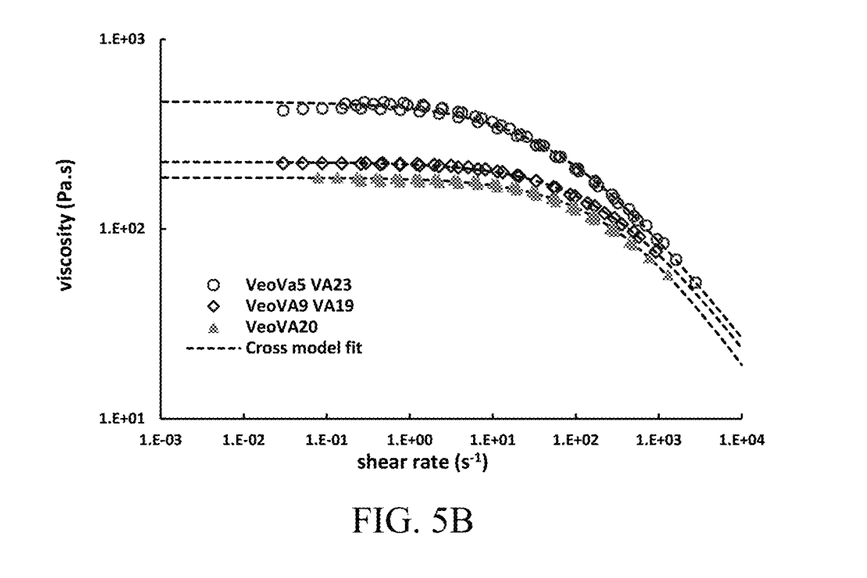
FIG. 5B illustrates complex viscosity of various ethylene-based polymers as a function of angular frequency at 150° C. with extrapolation lines for obtaining zero-shear viscosity.
Figure 6:
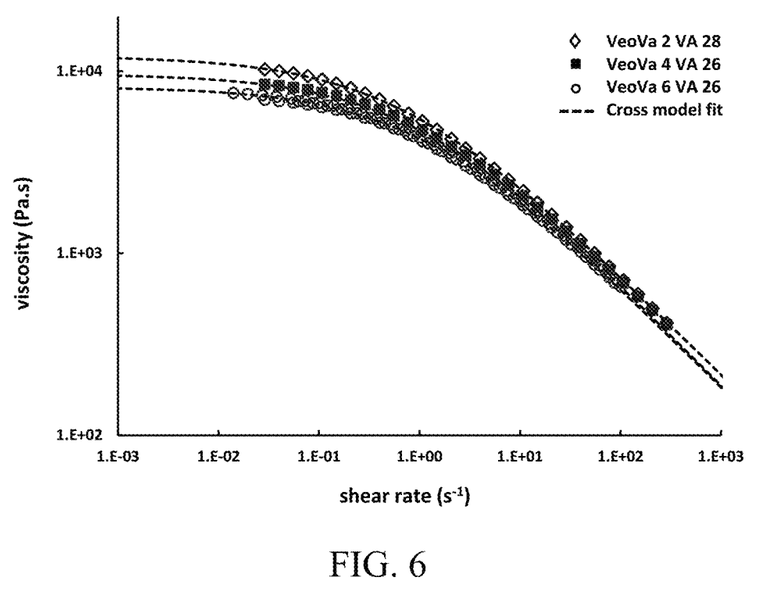
FIG. 6 illustrates complex viscosity of various ethylene-based polymers as a function of angular frequency at 150° C. with extrapolation lines for obtaining zero-shear viscosity.

The rheological properties of the exemplary ethylene-based polymers are shown in FIGS. 5A, 5B and 6. The plot of "PN 2021" in FIG. 5A represents a typical rheological behavior of polyethylene with LCB, and the rheological behavior seen in the plots of VeoVa 20 in FIG. 5A is typical of essentially linear polyethylene. PN 2021 is a commercially available ethylene-VA (EVA) copolymer from Braskem.

Zero-shear viscosity, $\eta_0$, of the ethylene-based polymer was obtained by extrapolating the plateau region of the complex viscosity curves of FIGS. 5A and 6 and determining the viscosity value at zero shear rate. The extrapolation lines of the complex viscosity curves obtained from various ethylene-based polymers are shown in FIGS. 5B and 6.

Zero-shear viscosity values of selective ethylene-based polymers with branched VE are summarized in Table 3.

TABLE 3

Zero-shear viscosity of ethylene-based polymers with branched VE

| Sample | | $\eta_0$ at 150° C. Pa · s |
|---|---|---|
| Example 5 | VeoVa 20 | 187 |
| Example 12 | VeoVA5 VA23 | 470 |
| Example 13 | VeoVA9 VA19 | 226 |
| Example 24 | VeoVa 2 VA 28 | 12100 |
| Example 25 | VeoVa 4 VA 26 | 9900 |
| Example 26 | VeoVa 6 VA 26 | 8200 |

To analyze the long chain branching frequency (LCBf) the samples were analyzed using a GPC instrument equipped with IR5 infrared detector and a four-capillary viscometry detector, the results of which are shown in Table 4.

TABLE 4

Summary of LCBf Results

| Samples | g' | g | $B_n$ | LCBf |
|---|---|---|---|---|
| EXAMPLE 5 | 0.715 | 0.620 | 8.048 | 1.284 |
| EXAMPLE 6 | 0.663 | 0.556 | 11.426 | 1.117 |
| EXAMPLE 7 | 0.878 | 0.830 | 2.173 | 0.547 |
| EXAMPLE 8 | 0.852 | 0.795 | 2.815 | 0.717 |
| EXAMPLE 10 | 0.927 | 0.897 | 1.155 | 0.334 |
| EXAMPLE 12 | 0.853 | 0.797 | 2.779 | 0.634 |
| EXAMPLE 13 | 0.948 | 0.926 | 0.787 | 0.270 |
| REFERENCE EXAMPLE 1 | 0.934 | 0.907 | 1.020 | 0.318 |

Figure 7:
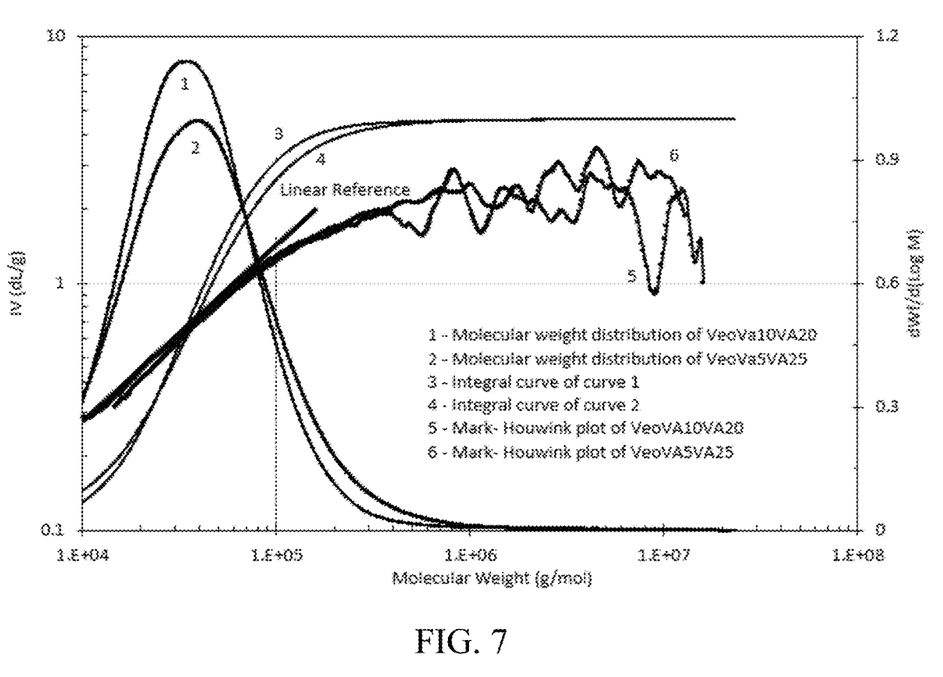
FIG. 7 illustrates intrinsic viscosity of various ethylene-based polymers as a function of molecular weight, as measured by GPC.

FIG. 7 shows a graph of intrinsic viscosity (IV) of ethylene-based polymers as a function of molecular weight (Mw), as measured by GPC. Curve 1 and 2 of FIG. 7 represent the molecular weight distribution measured by viscometry detector of the GPC instrument for Example 10 (VeoVa10 VA20) and Example 11 (VeoVa5 VA25). Curve 3 and 4 represent the integral curve of molecular weight distribution for samples from Example 10 (VeoVa10 VA20) and Example 11 (VeoVa5VA25). Curves 5 and 6 show the Mark-Houwink plot of Example 10 (VeoVa10 VA20) and Example 11 (VeoVa5 VA25), which represents the logarithmic relationship between IV and Mw. Curves 5 and 6 show a "linear region" below MW of 100 KDa (10000 g/mol), where the log of Mw and the log of IV are linearly proportional (as shown by the "linear reference" line drawn tangentially to the linear part of the MH plot). However, the relationship deviates from the slope at Mw greater than 100 KDa ("non-linear region"), which indicates that LCB is present. The areas under the curve of Curves 5 and 6 in the non-linear region were obtained, which represents the amount of branched material. It was found that the polymer with a higher amount of branched VE monomer (Curve 5, branched VE mol % of 1.79) had a smaller area under the non-linear region of the curve (10% of the area under the entire curve) than the polymer with a lower amount of branched VE monomer (Curve 6, branched VE mol % of 0.33, area under the non-linear region of the curve 15% of the area under the entire curve), indicating that an increase in the amount of branched VE in the polymer reduces the amount of long chain branched material.

Figure 8:
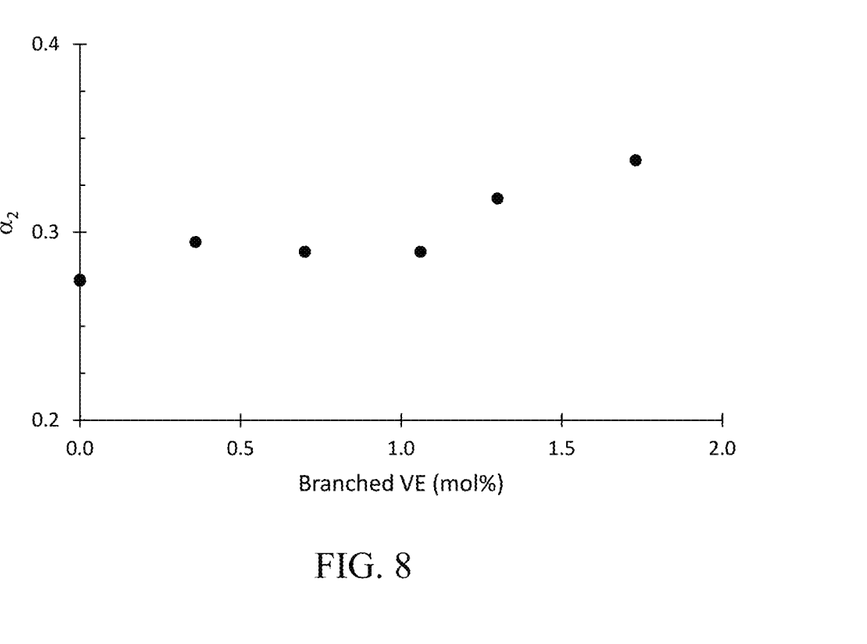
FIG. 8 illustrates Mark-Houwink plot slope of "non-linear region" as a function of branched vinyl ester content for EXAMPLES 23-28.

FIG. 8 shows the Mark-Houwink plot slope of "non-linear region" ($\alpha_2$) as a function of branched VE content for EXAMPLE 23-28. An increasing trend in $\alpha_2$ is observed as the branched VE content increases, mainly for amounts higher that 1 mol %. Increase in α2 indicates a decrease on branching level.

Figure 9:
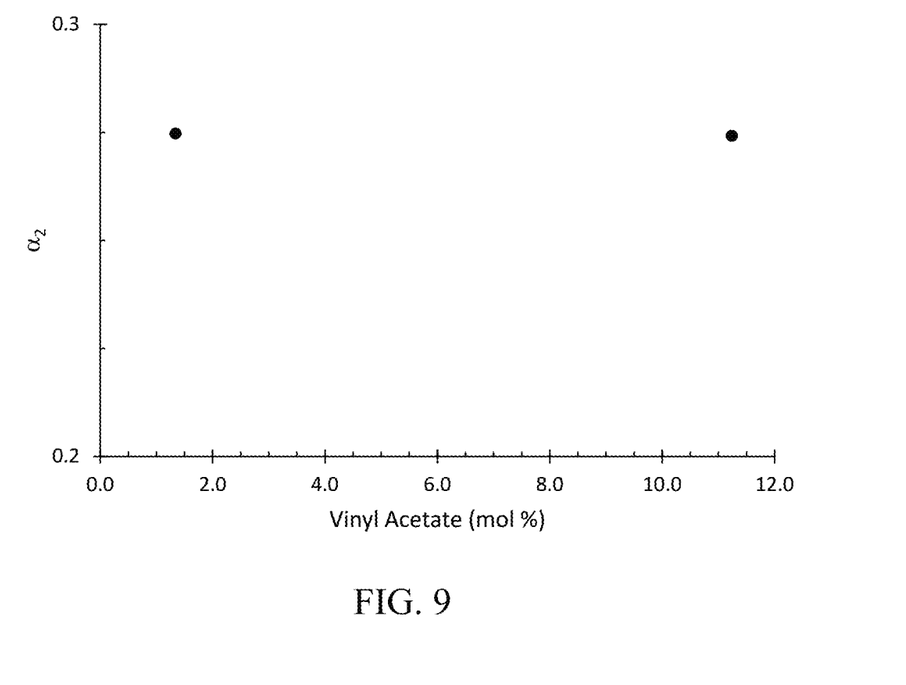
FIG. 9 illustrates Mark-Houwink plot slope of "non-linear region" as a function of vinyl acetate content for EXAMPLES 23 and 29.

FIG. 9 shows the Mark-Houwink plot slope of "non-linear region" ($\alpha_2$) as a function of vinyl acetate content for EXAMPLE 23 and 29. Constant $\alpha_2$ in FIG. 9 indicates that presence of vinyl acetate in the polymers does not affect the long chain branching.

The results of $^{13}$CNMR, GPC and rheological analyses show that branched VE may be used as an additive to modify the degree of LCB during production of LDPE and EVA copolymers in high-pressure assets. By adding an effective amount of branched VE, such as an amount ranging from about 0.01 mol % to 5.0 mol %, reduction of the degree of LCB of the ethylene-based polymer may be obtained.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method of controlling long chain branching in an ethylene-based polymer, comprising:
   polymerizing ethylene with one or more optional monomers to form the ethylene-based polymer; and
   controlling a degree of long chain branching (LCB) in the ethylene-based polymer to a range from 0.1 per 1000 carbon atoms in a polymer backbone to 10 per 1000 carbon atoms in the polymer backbone, as measured by $^{13}$CNMR, by adding one or more branched vinyl ester to the polymerizing in an amount ranging from 0.01 mol % to 5.0 mol %, relative to total monomer content, wherein the ethylene-based polymer has a zero-shear viscosity ($\eta_0$) at 150° C. ranging from 10 Pa·s to 5×10$^6$ Pa·s.

2. The method of claim 1, wherein the one or more branched vinyl ester monomers have the general structure (I):

wherein $R^1$, $R^2$, and $R^3$ have a combined carbon number of 3 to 20.

3. The method of claim 1, wherein the one or more branched vinyl ester monomers have the general structure (II):

wherein $R^4$ and $R^5$ have a combined carbon number of 7.

4. The method of claim 1, wherein the ethylene-based polymer is a copolymer consisting of ethylene and the one or more branched vinyl ester.

5. The method of claim 4, wherein a density of the ethylene-based polymer according to ASTM D792 ranges from 0.850 g/cm$^3$ to 1.30 g/cm$^3$.

6. The method of claim 1, wherein the ethylene-based polymer is a terpolymer consisting of ethylene, the one or more branched vinyl ester and vinyl acetate.

7. The method of claim 1, wherein the ethylene-based polymer has a vinyl acetate content ranging from 0.01 to 89.99 wt %.

8. The method of claim 1, wherein the ethylene-based polymer has a long chain branching frequency ranging from 0 to 20 LCBf/1000 carbon atoms, as measured by GPC.

9. The method of claim 1, wherein the adding the one or more branched vinyl ester reduces an LCB content in the ethylene-based polymer compared to a reference ethylene-based polymer without the one or more branched vinyl ester, as measured by determining an area under a non-linear region of an MH plot, the MH plot obtained from GPC.

10. The method of claim 1, wherein the polymerizing is conducted under conditions comprising a reactor pressure of greater than 1000 bar and a reactor temperature of greater than 50° C.

11. The method of claim 1, wherein the LCB, which is represented by $B_{6+}$, ranges from 0.1 per 1000 carbon atoms in the polymer backbone to 10 per 1000 carbon atoms in the polymer backbone, as measured by $^{13}$CNMR and determined by the following formula (1):

$$B_{6+} = S_{3,Polymer} - S_{3,vinyl\ ester\ monomers} \qquad (1)$$

where $S_{3\ polymer}$ is an $S_3$ peak positioned at 32.2 ppm on a $^{13}$CNMR spectrum of the ethylene-based polymer and $S3_{vinyl\ ester\ monomers}$ is an S3 peak positioned at 32.2 ppm on a $^{13}$CNMR spectrum of the one or more branched vinyl ester monomers.

12. The method of claim 1, wherein the ethylene-based polymer has a bio-based carbon content according to ASTM D6866-18 ranging from 1% to 100%.

13. The method of claim 1, wherein controlling the degree of LCB reduces the LCB, as compared to a reference ethylene-based composition without the one or more branched vinyl esters, from an amount ranging from 0 to 100%.

14. The method of claim 1, wherein the polymerizing is in a presence of a chain transfer agent.

15. The method of claim 1, further comprising blending the ethylene-based polymer with one or more additional polymers.

16. A polymer composition comprising the ethylene-based polymer obtained from the method of claim 1.

17. An article comprising the polymer composition of claim 16.

* * * * *